Oct. 12, 1937.   J. D. YOUNG   2,095,726
RESILIENT WHEEL
Filed July 9, 1936
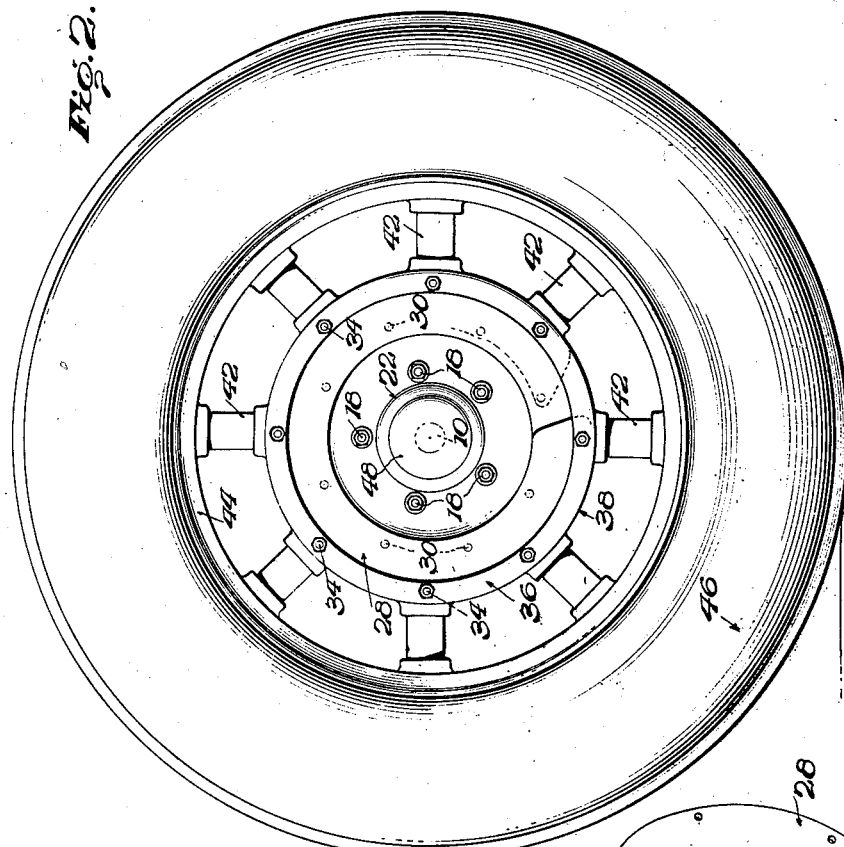
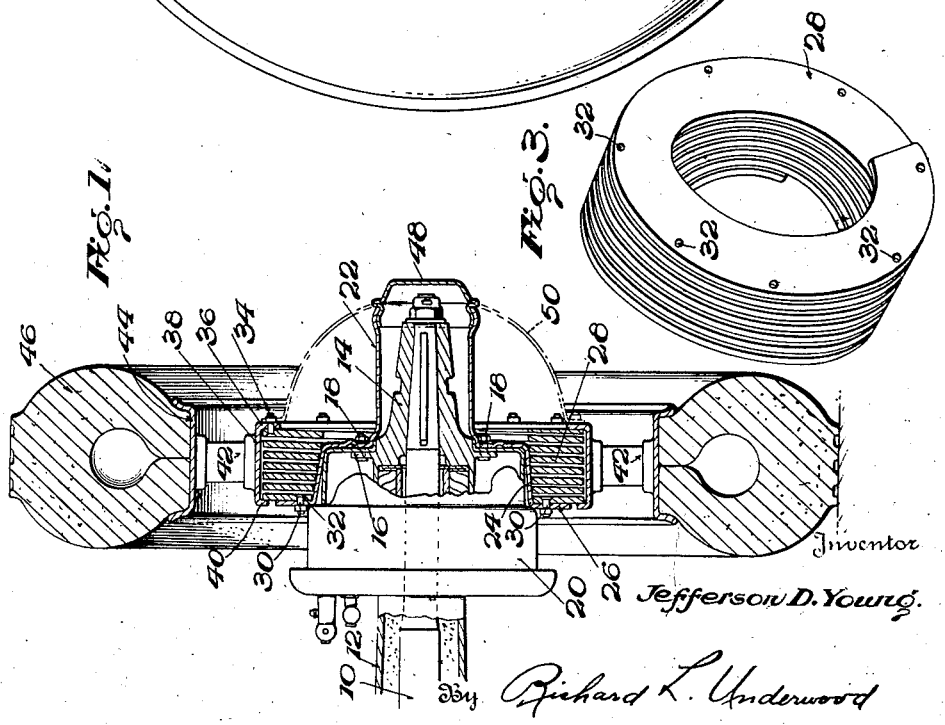
Inventor
Jefferson D. Young.
By Richard L. Underwood
Attorney Patented Oct. 12, 1937

2,095,726

UNITED STATES PATENT OFFICE 2,095,726

RESILIENT WHEEL

Jefferson D. Young, Chattanooga, Okla., assignor of forty-nine one-hundredths to T. F. Spurgeon, Frederick, Okla.

Application July 9, 1936, Serial No. 89,818

9 Claims. (Cl. 152—28)

This invention relates to resilient wheels and has particular reference to a structure which is readily demountable from its supporting hub and adapted for interchangeability with the conventional vehicle wheel in use today.

An object of the invention is to adapt the general principle of the well-known "spring wheel" construction for use with the present-day automobile vehicle hub structures and to so arrange the helical spring used to obtain the resilient action of the wheel and the yielding connection from the drive shaft that the entire wheel, including the spring, is readily removable from the hub for replacement purposes.

By the attainment of this end it will readily be seen that the advantages inherent in this type of wheel are rendered accessible to the vehicle owner by reason of the fact that he has only to substitute for the conventional wheel provided by the manufacturer an improved resilient wheel constructed in accordance with my invention.

A further object of the invention is to retain all of the characteristic functions of the spring wheel including the substantial elimination of the transmission of vibration and shocks through the wheel hub, even when solid tires are used, and at the same time provide a structure which is so simple and rugged in its characteristics that it cannot easily become broken or worn with constant rough usage.

Various other objects and meritorious features of the invention will be apparent from the following description taken in conjunction with the drawing, wherein:

Figure 1 is a fragmentary section through my improved demountable spring wheel assembly;

Figure 2 is a side elevation thereof, and

Figure 3 is a perspective of the helical spring associated with the wheel.

Referring now to Figure 1, numeral 10 illustrates the conventional drive shaft of an automotive vehicle encased in an axle housing 12 and having splined to the end thereof a hub 14. Hub 14 is provided with a radial flange 16 to which is secured by means of bolts 18 the closed end of brake drum 20.

A hub cap 22 encases the outer end of the hub 14 and is likewise secured to the hub flange 16 by means of bolts 18. A secondary drum 24 is preferably constructed integrally with the hub cap and, when the cap is in position, this secondary drum encompasses the closed inner end of the brake drum, as illustrated. The secondary drum 24 is provided with a circumferential radially extending flange 26 to which one outer coil of the helical spring 28 is secured at spaced intervals around its circumference by means of rivets or bolts, as indicated at 30, which extend through apertures 32 in the spring coil adapted to aline with apertures provided in the radial flange 26.

It is to be noted that coil 28 is of rugged construction, being fashioned as illustrated from a wide flat section of spring steel. The other outer coil of helical spring 28 is secured in the same manner, as indicated at 34, to the outer flange 36 of a metallic ring 38 to which the remainder of the wheel structure is secured. The inner side of ring 38 is provided with a flange 40 extending radially inwardly in the same maner as flange 36. Inasmuch as one of the outer coils of the spring 28 is fixedly secured against axial movement to the secondary drum 24 by means of bolts or rivets 30, and inasmuch as the ring 38 is prevented from axial movement through its inner flange 40 which abuts against the adjacent outer coil of the spring, it will be apparent that axial movement of any portion of the spring is precluded by the outer flange 36 of ring 38 to which the other outer coil of the spring is secured. In this way lateral movement of the ring 38 with reference to the hub 14 and spreading of the coil is prevented.

Spokes 42 are secured at circumferentially spaced intervals to the outer face of ring 38 in any suitable manner and tire rim 44 is suitably mounted upon the outer ends of the spokes. A solid cushion tire 46 of any desirable type may be mounted on the rim 44 in conventional fashion.

In the form illustrated the hub cap 22 is provided with an open outer end into which a snap closure 48 may be inserted. This snap closure may or may not be provided with a portion 50 spun out to cover the entire spring mounting, and such portion, if provided, may be secured by means of bolts 34 to the ring 38. As an alternative, the spun out portion 50 can be retained against the flange 36 of ring 38 simply by means of its inherent resiliency. The preferred form of the invention, however, eliminates the portion 50 disclosed in dotted lines, or relies upon its inherent resiliency as above described in order to eliminate the need of releasing more than one set of bolts for the purpose of removing the entire wheel assembly from its supporting hub.

That portion of the secondary drum 24 encasing part of the brake drum has a slightly conical surface and the inner edge faces of the coils of helical spring 28 are dimensioned to form a similar cone cooperating therewith. The clearance between the outer edges of the coils and the inner face of wheel supporting ring 38 is sufficient to provide the desired freedom of movement between said supporting ring and secondary drum portion 24. The wind-up action of the spring in providing a yielding drive connection is readily understood.

As may easily be seen from the foregoing description, this wheel constitutes an integral assembly which may be positioned on or removed from hub 14 simply by removing the nuts from bolts 18 and pulling the wheel assembly out from the hub. The bolts 18 will retain the brake drum 20 in proper position until such time as another wheel assembly is replaced and the nuts replaced on bolts 18. The simplicity of this arrangement, permitting demounting of the entire wheel assembly, obviously enables the vehicle owner to use either the conventional type of wheel or a spring wheel designed in accordance with my invention. One may be substituted for the other with ease and rapidity without the necessity of disconnecting the helical spring 28 from its positioning means within the wheel assembly. Furthermore, it will be understood that, while the invention has been illustrated in association with a conventional automotive vehicle drive wheel, the broad concept of the demountable spring wheel assembly is universally applicable.

It should likewise be observed that, where it is desirable to substitute only a wheel-supporting ring and its associated load-supporting wheel, bolts 34 only need be removed to detach such assembly from the outer coil of the helical spring 28. Thus the arrangement disclosed permits not only ready substitution of a conventional wheel assembly for the spring wheel assembly mounted by the bolts 18 extending through the radial flange 16 of the hub, but the substitution of one load-supporting wheel for another without removing the spring wheel assembly.

While I have described specific details of certain important basic features of my invention, it will be understood that one skilled in the art may easily depart from such details without departing from the general concept of the invention and for that reason I wish to limit myself only within the scope of the appended claims.

What I claim is:

1. In combination with a shaft having a hub secured to the end thereof, a brake drum and a radially overlapping secondary drum, means simultaneously and detachably securing both drums to said hub, and a coil spring wheel assembly detachably secured to said secondary drum.

2. In combination with a hub, a brake drum, an overlapping secondary drum, means for simultaneously and detachably securing both drums to said hub, a helical spring secured by one outer coil to the periphery of said secondary drum, and a load-supporting wheel detachably secured to the other outer coil of said spring.

3. In combination with a hub, an open-ended drum detachably secured thereto, a helical spring secured by one of its outer coils to the open end of said drum and surrounding said drum in overlapped relation thereto, and a wheel-supporting ring detachably secured to the other outer coil of said helical spring.

4. In combination with a hub provided with a radially extending flange, a brake drum positioned in concentric relation thereto, a secondary drum surrounding a portion of said brake drum and positioned concentrically therewith, said drums having adjacent flanges lying contiguous to one another and in abutting relation to said hub flange, means extending through said hub flange and said drum flanges for detachably securing the latter to the hub, a helical spring connected by one outer coil to the open end of said secondary drum, a wheel-supporting ring secured to the other outer coil of said spring and lying in concentric overlapped position with reference to said secondary drum, and a wheel assembly supported by said ring.

5. In combination with a shaft having a hub secured thereto, a brake drum, a secondary drum in concentric overlapped relation thereto, means extending through both the brake drum and the secondary drum to detachably secure them to said hub, a wheel-supporting ring positioned in concentric overlapped relation to said secondary drum, and a helical spring positioned between said secondary drum and said ring, one outer coil of said spring being secured to the secondary drum and the other to said ring.

6. The combination of a hub member fixedly positioned with reference to a rotatable shaft, a brake drum secured thereto, a secondary drum enclosing a portion of said brake drum and detachably secured to said hub, a helical spring secured to and surrounding said secondary hub, and a wheel-supporting ring detachably secured to another portion of said spring to provide a yielding connection between said secondary drum and said wheel-supporting ring.

7. In combination with a hub, a drum detachably secured thereto, said drum including a side wall and a radial flange at one end thereof, a helical spring having one outer coil attached to the radial flange of said drum, and a wheel-supporting ring detachably secured to the other outer coil of said spring, said drum wall, radial flange, and ring forming a casing for said helical spring.

8. In combination with a hub having a radial flange, a tubular member surrounding a substantial portion of said hub and provided with an offset intermediate its ends to thereby form adjacent sections of different diameter, means extending through the radial flange of said hub and the offset portion of said tubular member for detachably securing the latter to the hub, a radial flange extending around that section of said tubular member having the larger circumference, a helical spring having one outer coil attached to said last-mentioned radial flange, a wheel-supporting ring having inwardly extending radial flanges at each end thereof detachably secured to the other outer coil of said spring and providing through its flanges a closure against substantial axial movement of the spring coils, and a load-supporting wheel secured to said ring in substantially concentric overlapped relation to the spring.

9. In combination with a vehicle hub having a radial flange adjacent its end, an open-ended drum with an annular flange adjacent said hub flange, means readily accessible from the end of said hub detachably securing said drum flange to said hub flange, a helical spring in concentric overlapping relation to said drum, one outer coil thereof being secured to the open end of said drum, a wheel-supporting ring embracing the outside of said helical spring and detachably secured to the outer coil thereof, and a load-supporting wheel carried by said ring.

JEFFERSON D. YOUNG.